(12) United States Patent
Chockler et al.

(10) Patent No.: US 7,853,932 B2
(45) Date of Patent: Dec. 14, 2010

(54) SYSTEM, METHOD AND COMPUTER PROGRAM PRODUCT FOR CHECKING A SOFTWARE ENTITY

(75) Inventors: Hana Chockler, Haifa (IL); Eitan Daniel Farchi, Pardes Hana (IL); Ziv Glazberg, Haifa (IL); Benyamin Godlin, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 1038 days.

(21) Appl. No.: 11/456,226

(22) Filed: Jul. 10, 2006

(65) Prior Publication Data

US 2008/0052692 A1    Feb. 28, 2008

(51) Int. Cl.
     *G06F 9/44*      (2006.01)

(52) U.S. Cl. ................................ 717/132; 717/126

(58) Field of Classification Search ......... 717/120–161; 714/30–38
See application file for complete search history.

(56) References Cited

U.S. PATENT DOCUMENTS

| | | | |
|---|---|---|---|
| 5,826,065 A * | 10/1998 | Hinsberg et al. | 717/104 |
| 6,055,543 A | 4/2000 | Christensen et al. | |
| 6,105,018 A * | 8/2000 | Demers et al. | 707/2 |
| 6,442,658 B1 * | 8/2002 | Hunt et al. | 711/158 |
| 6,557,120 B1 | 4/2003 | Nicholson et al. | |
| 6,594,824 B1 * | 7/2003 | Volkonsky et al. | 717/159 |
| 7,580,814 B1 * | 8/2009 | Seroussi | 703/2 |
| 2003/0046609 A1 * | 3/2003 | Farchi et al. | 714/30 |
| 2004/0210900 A1 | 10/2004 | Jones et al. | |
| 2005/0166202 A1 | 7/2005 | Gerell et al. | |
| 2005/0182602 A1 * | 8/2005 | Lim et al. | 703/2 |
| 2005/0257200 A1 * | 11/2005 | Taylor | 717/136 |

FOREIGN PATENT DOCUMENTS

| | | |
|---|---|---|
| WO | WO2005065166 | 7/2005 |
| WO | WO2005098595 | 10/2005 |

OTHER PUBLICATIONS

Russ Miller, "Algorithms Sequential and Parallel: A Unified Approach", Aug. 3, 2005, Course Technology PTR, 2nd Edition, section "Minimum-Cost Spanning Trees".*
Thomas Ball, "Efficient Path Profiling", 1996, IEEE Proceeding of MICRO-29.*
John Regher, "Random Testing of Interrupt-Driven Software", EMSOFT'02, Sep. 2005, pp. 19-22.
O.Edelstein, E.Farchi, E.Goldin, Y.Nir, G.Ratsaby, and S.Ur. "Testing multi-threaded Java .programs." IBM System Journal Special Issue on Software Testing, 41(1), Feb. 2002.
M. Mitzenmacher and E. Upfal. "Probability and Computing: Randomized Algorithms and Probabilistic Analysis." Cambridge University Press, UK, 2005.

* cited by examiner

*Primary Examiner*—Wei Y Zhen
*Assistant Examiner*—Chung Cheng

(57) ABSTRACT

System, method and computer program product for checking a software entity, the method includes: providing a direct acyclic graph representative of possible execution paths of the software entity; wherein multiple successor nodes that succeed a certain parent node are associated with different execution probabilities; randomly selecting a successor node out of the multiple successor nodes in response the execution probabilities; and checking the software entity in response to the selection.

20 Claims, 8 Drawing Sheets

SYSTEM, METHOD AND COMPUTER PROGRAM PRODUCT FOR CHECKING A SOFTWARE ENTITY

FIELD OF THE INVENTION

The present invention relates to methods, systems and computer program products for checking a software entity.

BACKGROUND OF THE INVENTION

The complexity and the significant of software have dramatically increased during the last decades. Some software verification techniques are being developed in order to test programs while other model checking techniques verify that the program operates according to expectations.

There are various types of software verification tools. A first type of software verification tools, model checkers, such as but not limited to ExpliSAT® of IBM®, deterministically check all possible behaviors of a program. These first type software verification tools maintain a record of paths that were checked in order to prevent double checking of the same path.

A second type of software verification tools, such as but not limited to ConTest® of IBM®, randomly check program paths. It does not track the paths that it already checked and randomly selects (at non-deterministic selection points) a successor state (or path) from a uniform distribution over all successors. Accordingly, the chances of checking paths that include many non-deterministic branching points are lower than the chances of checking paths that include fewer non-deterministic branching points.

Due to the random nature of the second type of software model checking tools it is impossible to define a required testing period that will guarantee that all the paths of a program were checked.

The following articles, U.S. patents and patent applications, all being incorporated herein by reference, illustrate various software testing systems and devices that use random schedulers for testing software: U.S. patent application publication serial number 2005/0166202 of Gerell et al., U.S. patent application publication serial number 2004/0210900 of Jones et al., U.S. Pat. No. 6,557,120 of Nicholson et al., "Random Testing of Interrupt-Driven Software", John Regher, EMSOFT'02, September 2005, pages 19-22, Jersey City, N.J. U.S.A.

There is a need to provide efficient devices, methods and computer program products for checking software entities.

SUMMARY OF THE PRESENT INVENTION

System, method and computer program product for checking a software entity, the method includes: providing a direct acyclic graph representative of possible execution paths of the software entity; wherein multiple successor nodes that succeed a certain parent node are associated with different execution probabilities; randomly selecting a successor node out of the multiple successor nodes in response the execution probabilities; and checking the software entity in response to the selection.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

Methods, systems and computer program products are provided for testing a software entity. The testing includes determining execution probabilities of various program states in response to various parameters such as a structure of a direct acyclic graph representative of the execution paths of the software module and optionally in response to additional parameters such as risk associated with a certain path.

Conveniently, the execution probabilities are calculated such as to affect the probability of executing certain execution paths, of entering certain execution states and the like.

Figure 1:
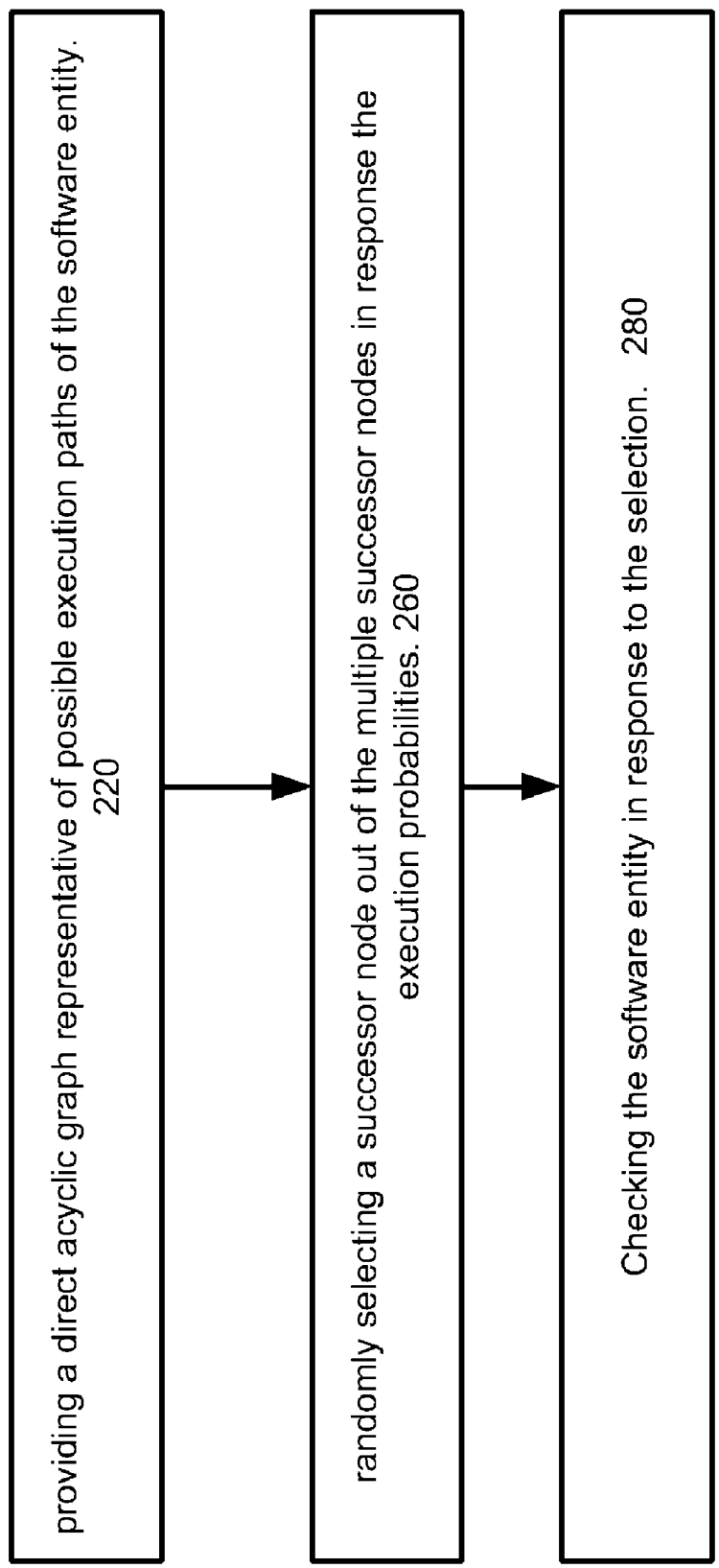
FIG. 1 illustrates a method for checking a software entity according to an embodiment of the invention.

FIG. 1 illustrates method 200 for checking a software entity according to an embodiment of the invention.

Method 200 starts by stage 220 of providing a direct acyclic graph representative of possible execution paths of the software entity. Multiple successor nodes that succeed a certain parent node are associated with different execution probabilities. It is noted that the direct acyclic graph can include multiple parents nodes and each of these parent nodes can be associated with multiple successor nodes and that the execution probability associated with one successor node can differ from the execution probability of another successor node. It is noted that some of the successor nodes that succeed the same parent node can have the same probability.

According to an embodiment of the invention the execution probabilities are defined such as to substantially guarantee that all paths of the direct acyclic graph are executed with the same probability.

According to an embodiment of the invention stage 220 includes converting a control flow graph representative of possible execution paths of the software entity to a direct acyclic graph. The conversion can include unwinding limited repetition loops.

Figure 2:
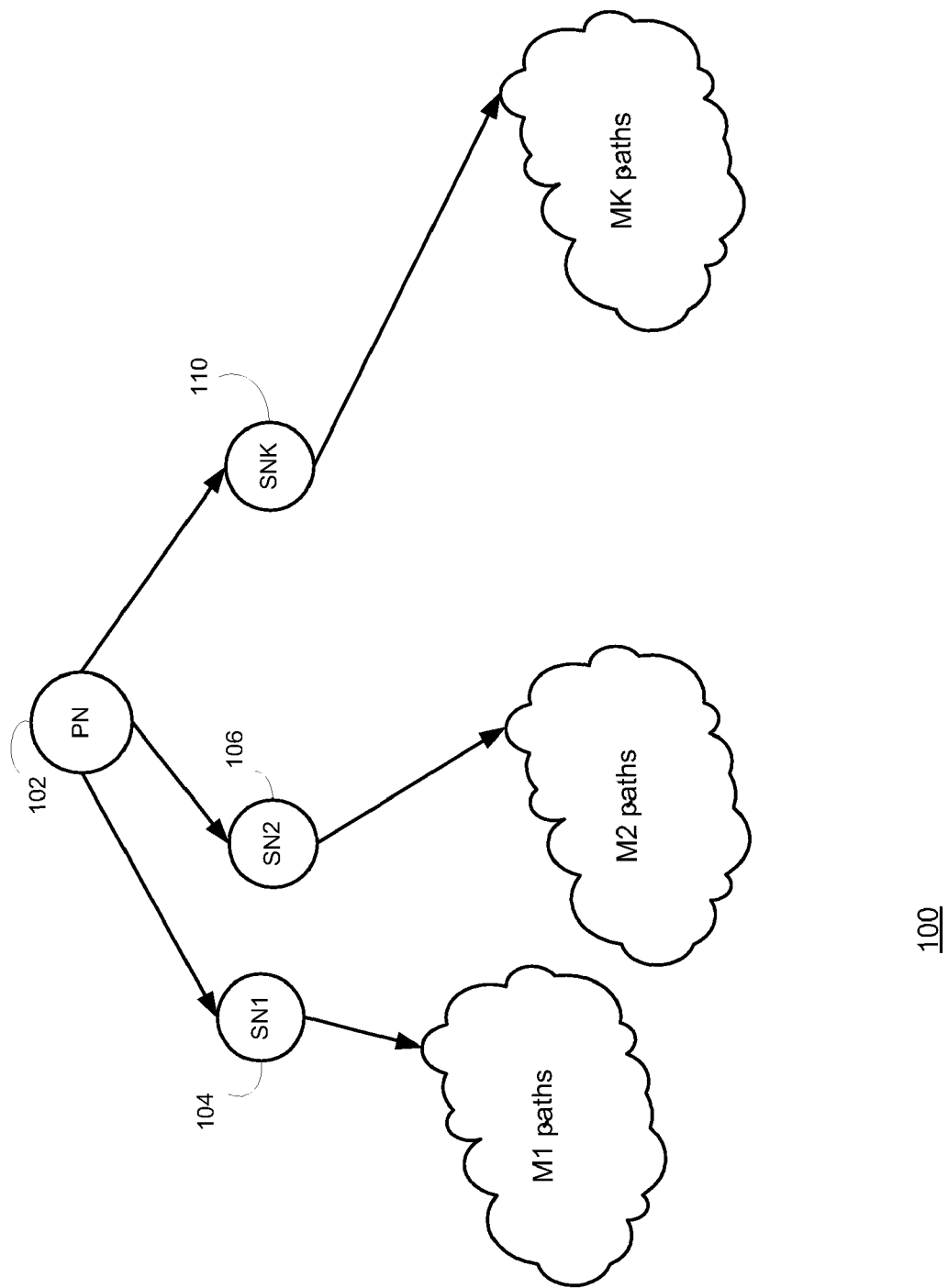
FIG. 2 illustrates a portion of a direct acyclic graph, according to an embodiment of the invention.

According to an embodiment of the invention stage 220 includes determining an execution probability of a successor node in response to a number of paths that originate from the successor node. Conveniently, the determining includes determining an execution probability of a successor node in an inverse proportion to a number of paths that originate from the successor node. Referring to FIG. 2, parent node PN 102 has multiple successor nodes SN1-SNK 104-110 (wherein K is a positive integer), wherein $M_1, \ldots M_K$ paths originate from successor nodes SN1-SNK 104-110 accordingly. If we denote M as the aggregate number paths that originate from SN1-SNK 104-110 ($M = M_1 + M_2 + \ldots + M_K$) then the execution probability of the k'th successor node (wherein k ranges between 1 and K) is equal to $M_k/M$.

Conveniently, the direct acyclic graph includes multiple levels. In other words each successor node (except exit nodes) is also parent nodes. Accordingly, execution probabilities can be assigned in an iterative manner, starting from the exits nodes and going upwards (toward the enter node).

The mentioned above method can guarantee that each path will be executed during the test with substantially the same probability. Conveniently, if the execution probabilities of successor nodes are allocated such that different paths (even of different length) are executed with substantially the same probability then the number of iteration required to execute multiple paths with given probability (or more exactly a probability that is bound by a known threshold) can be calculated in advance. Conveniently, E iterations of stages 260-280 are required for testing n paths with a certainty that is bounded by $e^{-c}$; wherein E equals $n*\ln(n)+c*n$, wherein c is a positive integer.

According to another embodiment of the invention some paths can be executed with higher probability than other paths, wherein the difference in the probability does not necessarily result from different lengths but from a need to test some paths that can be more problematic (Associated with higher risk indications). The risk indication can be determined in response to the structure of the software entity module, in response to previous results of a testing effort, and the like. The risk indication can be provided by a user of the program, by a testing administrator and the like.

Stage 220 is followed by stage 260 of randomly selecting a successor node out of the multiple successor nodes in response the execution probabilities.

Stage 260 is followed by stage 280 of checking the software entity in response to the selection.

It is noted that multiple iterations of stages 260-280 can be executed before the software entity testing is stopped. During each iteration the software entity is executed. At each decision point that involves a non-deterministic selection between successor nodes the method performs the selection in response to the execution probabilities.

Figure 3:
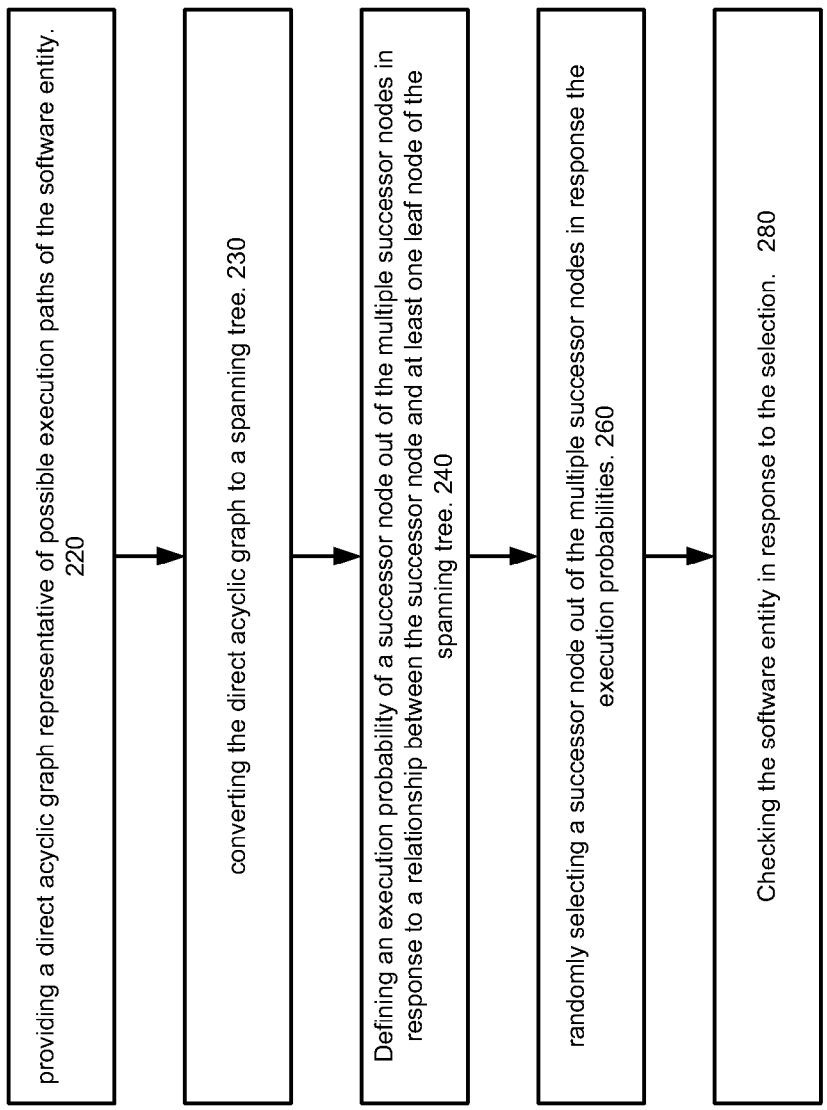
FIG. 3 illustrates a method for checking a software entity according to another embodiment of the invention.

FIG. 3 illustrates method 201 for checking a software entity according to an embodiment of the invention.

Method 201 of FIG. 3 differs from method 200 of FIG. 1 by including stages 230 and 240.

Method 201 computes execution probabilities of edges that guarantee visiting all states of the direct acyclic graph with high probability.

Stage 230 includes converting the direct acyclic graph to a spanning tree. Stage 230 is followed by stage 240 of determining an execution probability of a successor node out of the multiple successor nodes in response to a relationship between the successor node and at least one leaf node of the spanning tree. Conveniently, an execution probability of zero is assigned to paths in the direct acyclic graph that do not appear in the spanning tree. The execution probabilities of visited nodes of the spanning tree can be assigned as being proportional to the number of leaf nodes of the spanning tree and then assigning probabilities of other nodes in response to the execution probabilities associated with the visited nodes. It is noted that the execution probabilities can be further altered in response to risk indications associated with some paths.

Figure 4:
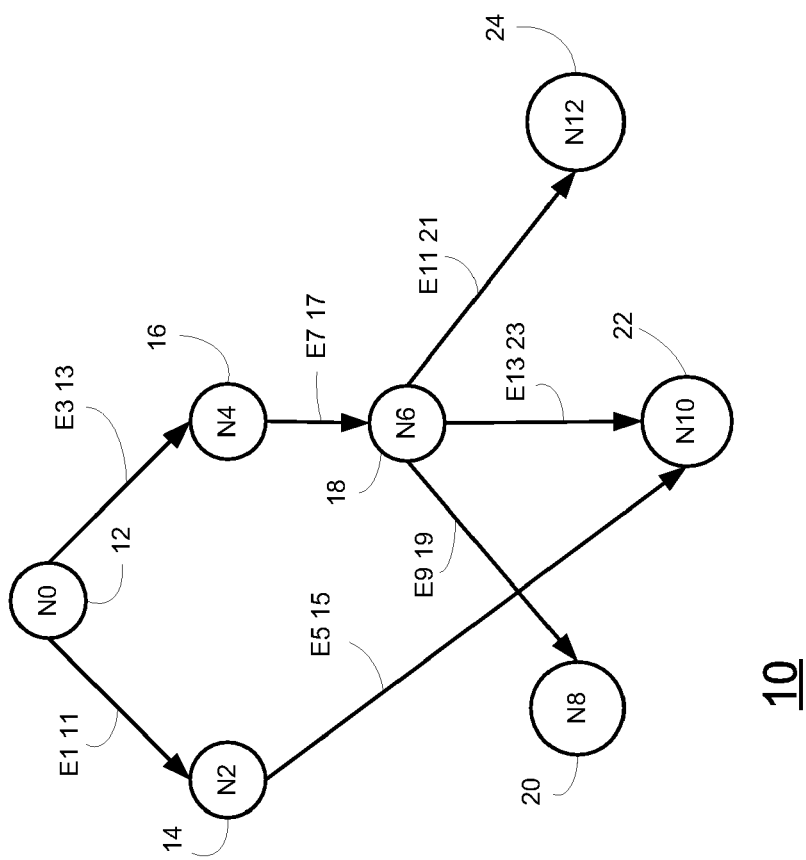
FIG. 4 illustrates a portion of a direct acyclic graph, according to an embodiment of the invention.
Figure 5:
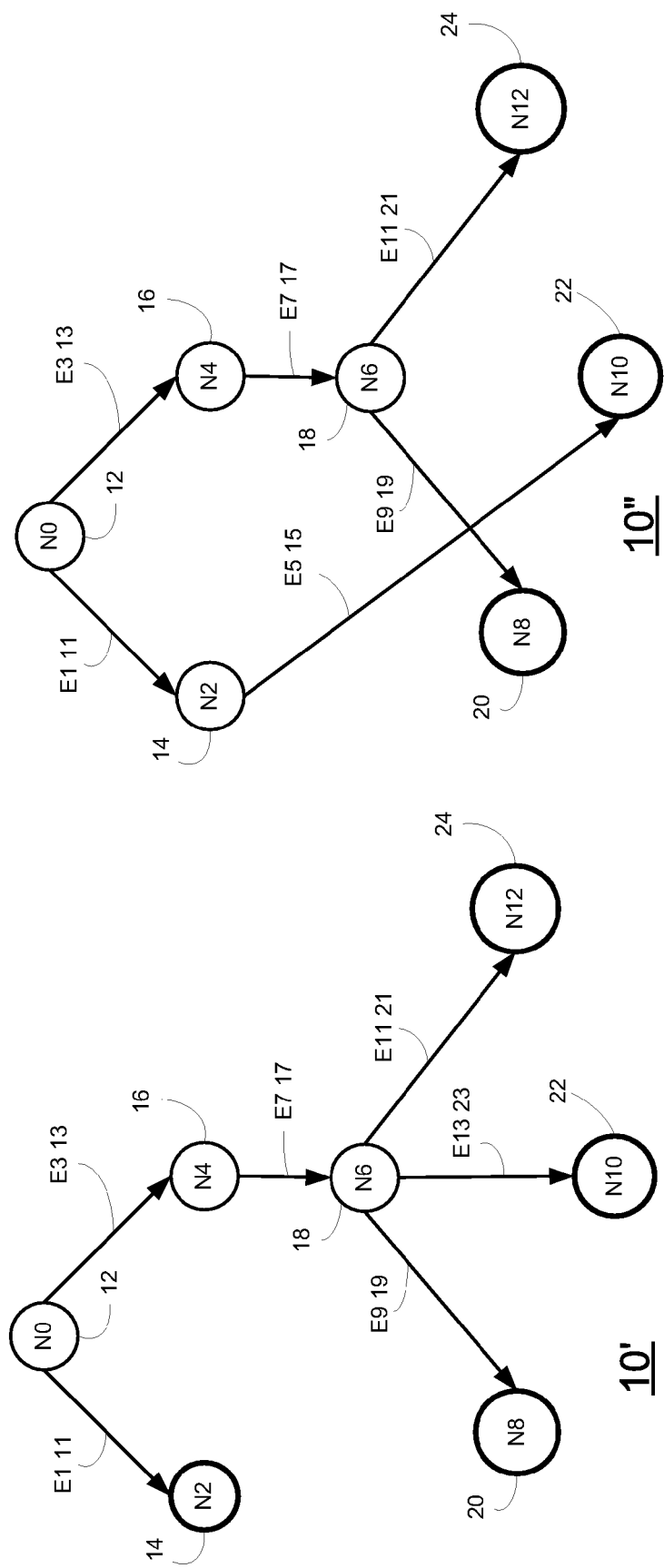
FIG. 5 illustrates a portion of a spanning tree and of a minimum-leaves spanning tree, according to an embodiment of the invention.

FIGS. 4 and 5 and tables 1 and 2 illustrate an exemplary portions 10 a direct acyclic graph and an exemplary portion 10' of spanning tree.

TABLE 1

(direct acyclic graph).

| Parent node | Successor node | Edge connecting these nodes |
|---|---|---|
| N0 12 | N2 14 | E1 11 |
| N0 12 | N4 16 | E3 13 |
| N2 14 | N10 22 | E5 15 |
| N4 16 | N6 18 | E7 17 |
| N6 18 | N8 20 | E9 19 |
| N6 18 | N10 22 | E13 23 |
| N6 18 | N12 24 | E11 21 |

TABLE 2

(spanning tree).

| Parent node | Successor node | Edge connecting these nodes |
|---|---|---|
| N0 12 | N2 14 (leaf node) | E1 11 |
| N0 12 | N4 16 | E3 13 |
| N4 16 | N6 18 | E7 17 |
| N6 18 | N8 20 (leaf node) | E9 19 |
| N6 18 | N10 22 (leaf node) | E13 23 |
| N6 18 | N12 24 (leaf node) | E11 21 |

Portion 10' of a spanning tree includes four leaf nodes that are each associated with an execution probability of ¼. Node N6 as well node N4 is associated with an execution probability of ¾.

Figure 6:
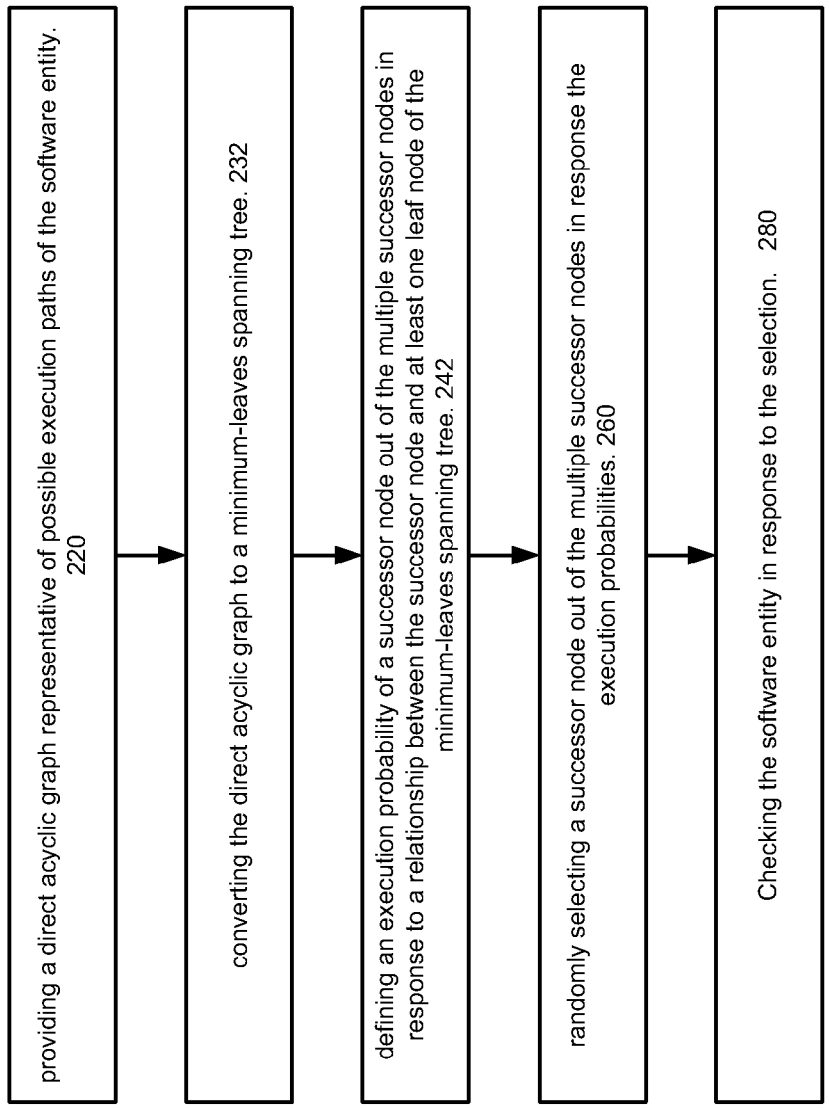
FIG. 6 illustrates a method for checking a software entity according to a further embodiment of the invention.

FIG. 6 illustrates method 202 for checking a software entity according to an embodiment of the invention.

Method 202 of FIG. 6 differs from method 200 of FIG. 3 by including stages 232 and 242.

Stage 232 includes converting the direct acyclic graph to a minimum-leaves spanning tree.

Stage 232 is followed by stage 242 of determining an execution probability of a successor node out of the multiple successor nodes in response to a relationship between the successor node and at least one leaf node of the minimum-leaves spanning tree. Conveniently, an execution probability of zero is assigned to paths in the direct acyclic graph that do not appear in the minimum-leaves spanning tree. The execution probabilities of visited nodes of the minimum-leaves spanning tree can be assigned as being proportional to the number of leaf nodes of the minimum-leaves spanning tree and then assigning probabilities of other nodes in response to the execution probabilities associated with the visited nodes FIGS. 1 and 2 and tables 1 and 3 illustrate exemplary portions 10 a direct acyclic graph and an exemplary portion 10" of spanning tree.

TABLE 3

(minimum-leaves spanning tree).

| Parent node | Successor node | Edge connecting these nodes |
|---|---|---|
| N0 12 | N2 14 | E1 11 |
| N0 12 | N4 16 | E3 13 |
| N2 14 | N10 22 | E5 15 |
| N4 16 | N6 18 (leaf node) | E7 17 |
| N6 18 | N8 20 (leaf node) | E9 19 |
| N6 18 | N12 24 (leaf node) | E11 21 |

Portion 10" of a spanning tree includes three leaf nodes that are each associated with an execution probability of ⅓. Node N6 as well node N4 is associated with an execution probability of ⅔.

Conveniently, the direct acyclic graphs are calculated for given input values.

Figure 7:
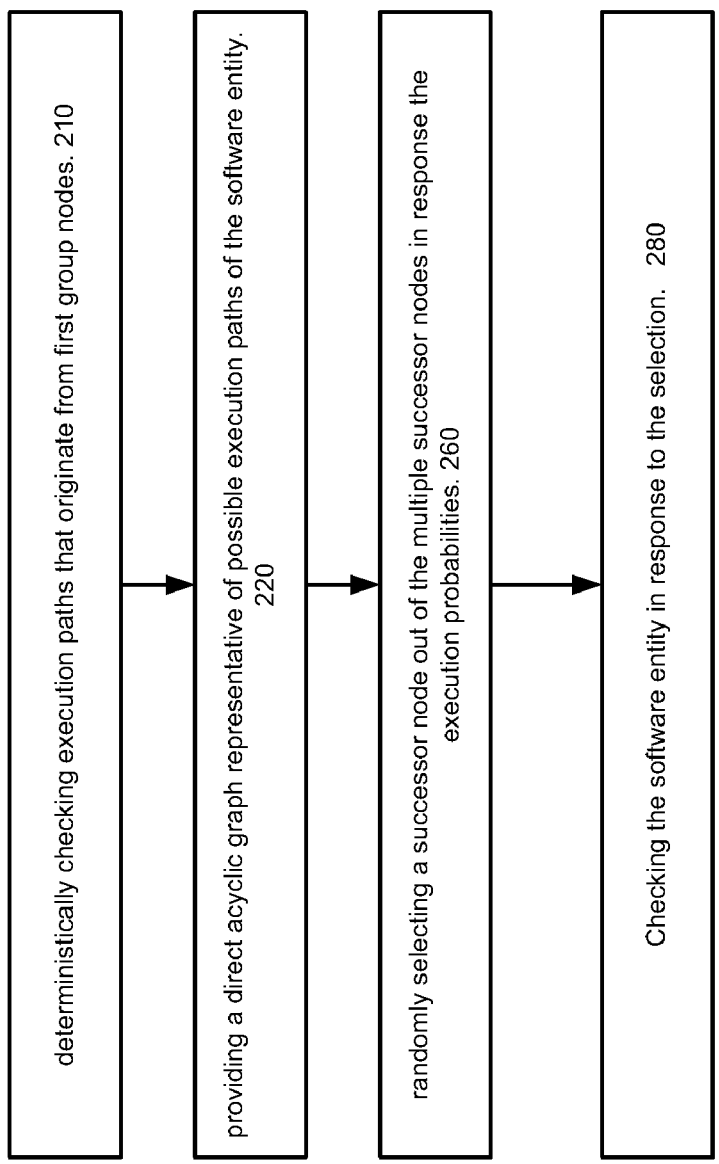
FIG. 7 illustrates a method for checking a software entity according to a yet another embodiment of the invention.

FIG. 7 illustrates method 203 for checking a software entity according to an embodiment of the invention.

According to yet another embodiment of the invention a combination of deterministic checks of paths as well as a weighted random based checks of paths are provided. The deterministic check can scan one path after the other until a predefined control criterion (for example—number of paths checked, error rate, memory space allocated for path tracking exceeded a threshold) is fulfilled. Then, one of the mentioned above probabilistic methods (for example, methods 200-202) can be applied, conveniently for the remaining paths.

Accordingly, as illustrated by FIG. 7, stage 220 can be preceded by stage 210 of deterministically checking execution paths that originate from first group nodes. The first group nodes define paths that are deterministically checked one path after the other. The first group can be defined in advance but can also be defined as the nodes that were deterministically checked before the predefined control criterion was fulfilled.

Paths that originate from a second group of nodes (that is disjoint from the first group of nodes) are scanned in a random manner, for example by any method of methods 200-202.

Yet according to another embodiment of the invention the execution probabilities can be computed such as to increase coverage (by distributing execution probabilities) of any subset of elements S of the direct acyclic graph with a partial order. For example, edges of the scheduling graph. Accordingly method 200 can include a stage of transforming the direct acyclic graph so that elements of S are nodes and then jump to stage 230 (or 232). For example, if S is the set of edges, the transforming stage includes switching the roles of nodes and edges (nodes are translated to several edges to preserve connectivity).

It is noted that a direct acyclic graph can be provided for input values. Some edges in the graph are not random in nature but depend upon a value of an input variable. Conveniently such a direct acyclic graph can be processed in any of the mentioned above manners and the calculated execution probabilities can be provided to a testing device and/or tester and can be used to indicate which input values to provide during tests of the software.

Figure 8:
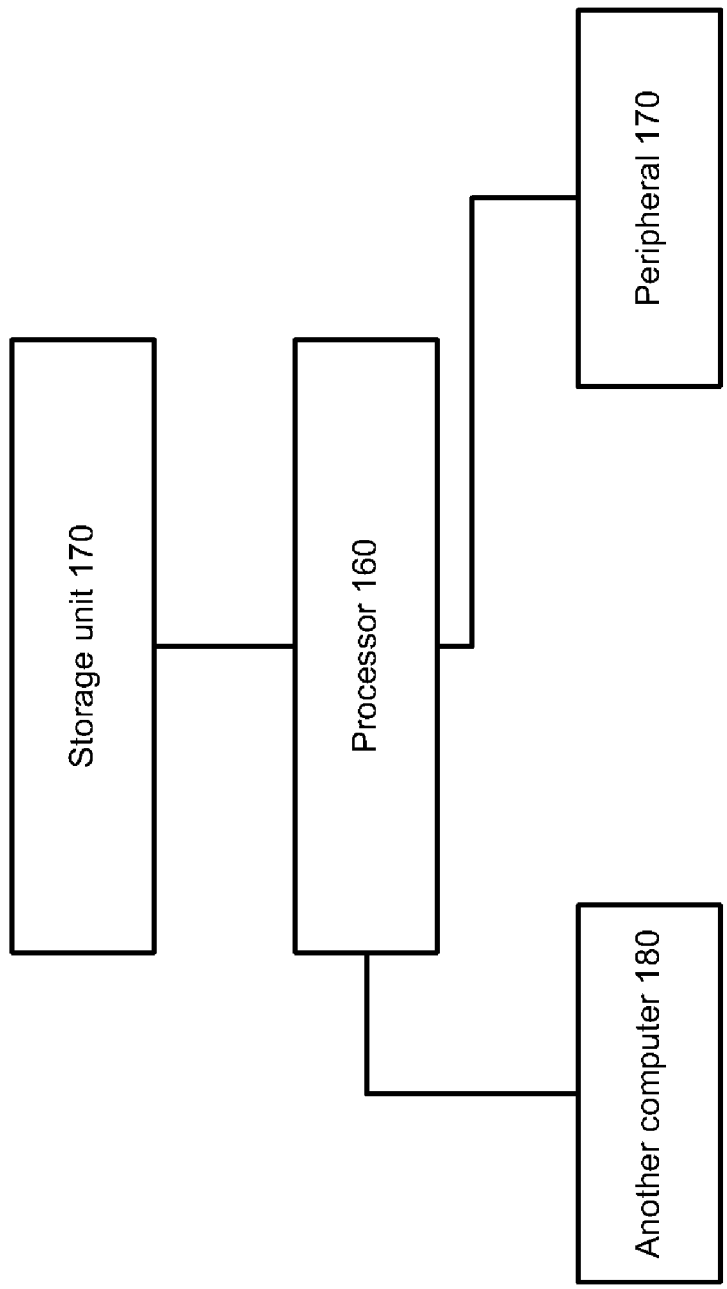
FIG. 8 illustrates a system for checking a software entity according to an embodiment of the invention.

FIG. 8 illustrates system 100 according to an embodiment of the invention.

System 100 can execute any of the mentioned above methods. System 100 includes at least one computer that in turn includes at least one processor such as processor 160 and a storage unit 170. Processor 160 can execute software entity testing code. The execution can require an interaction between processor 160 and/or one or more of the computers and between other software entities and hardware modules such as a peripheral 180, another computer 190 and the like. For simplicity of explanation only two additional modules were illustrated.

Storage unit 170 is adapted to store a direct acyclic graph representative of possible execution paths of the software entity. Multiple successor nodes that succeed a certain parent node are associated with different execution probabilities. Typically multiple parent nodes are succeeded by multiple sets of successor nodes that can be associated with different execution probabilities.

Processor 160 is adapted to randomly select a successor node out of the multiple successor nodes in response the execution probabilities and to check the software entity in response to the selection. Thus, the processor 160 executes the software entity and if it arrives to a non-deterministic selection point between multiple successor nodes it selects a selected node in response to the execution probability associated with the successor nodes.

Conveniently, processor 160 is adapted to convert a control flow graph representative of possible execution paths of the software entity to a direct acyclic graph. Thus loops that are characterized by limited (finite) number of iterations are unwound.

Conveniently, processor 160 is adapted to determine an execution probability of a successor node in response to a number of paths that originate from the successor node.

Conveniently, processor 160 is adapted to determine an execution probability of a successor node in proportion to a number of paths that originate from the successor node.

Conveniently, processor 160 is adapted to determine an execution probability of a successor node in response to a risk indication associated with at least one path that originates from the successor node.

Conveniently, processor 160 is adapted to determine a number (E) of software entity check iterations required for testing a predefined number (n) of execution paths at a certain probability (p). If the execution probabilities of successor nodes of the direct acyclic graph are defined such that different paths have the same execution probability then p is bounded by $e^{-c}$ and E equals $n*\ln(n)+c*n$, wherein c is a positive integer.

Conveniently, processor 160 is adapted to convert the direct acyclic graph to a spanning tree and determine an execution probability of a successor node out of the multiple successor nodes in response to a relationship between the successor node and at least one leaf node of the spanning tree.

Conveniently, processor 160 is adapted to convert the direct acyclic graph to a minimum-leaves spanning tree and determine an execution probability of a successor node out of the multiple successor nodes in response to a relationship between the successor node and at least one leaf node of a minimum-leaves spanning tree.

Conveniently, processor 160 is adapted to perform a deterministic software entity execution check and then, after executing certain paths continue by executing paths in a random manner. Conveniently, the possible execution paths are represented by a first group of nodes and a second group of nodes and multiple second group successor nodes that succeed a certain parent node are associated with different execution probabilities. Processor 160 first deterministically checks execution paths that originate from first group nodes, and then randomly selects a second group successor node out of the multiple second group successor nodes in response to the execution probabilities and checks the software entity in response to the selection.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

We claim:

1. A method for checking a software entity in a computerized environment comprising a processor, the method comprises:
   providing a directed acyclic graph representative of possible execution paths of the software entity; wherein multiple successor nodes that succeed a parent node are associated with original execution probabilities;
   determining execution probabilities for each of the successor nodes; wherein for at least a portion of the successor nodes the execution probability is different than the original execution probability;
   checking the software entity by the processor; wherein said checking comprises:
      determining a first state of the software entity; wherein the first state is associated with the software entity executing the parent node;
      randomly selecting a successor node out of the multiple successor nodes; wherein said randomly selecting is performed based on a stochastic selection based on the determined execution probabilities;
      modifying the first state of the software entity to a second state of the software entity, the second state is associated with the software entity executing the randomly selected successor node; and
      whereby a state of the computerized environment is modified in accordance with the successor node.

2. The method according to claim 1 wherein the providing comprises converting a control flow graph representative of possible execution paths of the software entity to the directed acyclic graph.

3. The method according to claim 1 wherein said determining execution probabilities comprises determining an execution probability of a successor node in response to a number of paths in the directed acyclic graph that originate from the successor node; wherein each path comprises at least two nodes.

4. The method according to claim 1 wherein said determining execution probabilities comprises determining an execution probability of a successor node in an inverse proportion to a number of paths in the directed acyclic graph that originate from the parent node.

5. The method according to claim 1 wherein said determining execution probabilities comprises determining an execution probability of a successor node out of the successor nodes in response to a risk indication associated with at least one path that originates from the successor node.

6. The method according to claim 1 further comprising determining a number (E) of software entity check iterations required for testing a predefined number (n) of execution paths at a probability (p); wherein the execution paths comprise at least the successor nodes; and performing said checking the software entity at least the number (E) of software entity check iterations.

7. The method according to claim 1 wherein the providing comprises converting the directed acyclic graph to a spanning tree; and determining an execution probability of a successor node to be negligible in case the successor node is not connected to the parent node in the spanning tree.

8. The method according to claim 7, wherein the spanning tree is a minimum-leaves spanning tree; and wherein said determining execution probabilities comprises determining the execution probabilities in an iterative manner by:
   determining a uniform distribution to all leaves of the minimum-leaves spanning tree:
   and determining the execution probabilities associated with nodes of the directed acyclic graph to enforce the uniform distribution.

9. The method according to claim 1, wherein the possible execution paths are represented by a first group of nodes and a second group of nodes;
   wherein the second group comprising the multiple successor nodes; the method further comprises deterministically checking execution paths that originate from the first group nodes; and wherein the first group comprises at least two execution paths that comprise a second parent node; wherein each of the at least two execution paths has an alternative successor node to the second parent node.

10. A computer program product comprising a non-transitory computer usable medium including a computer readable program, wherein the computer readable program when executed on a computer causes the computer to:
   provide a directed acyclic graph representative of possible execution paths of the software entity, wherein multiple successor nodes that succeed a parent node are associated with original execution probabilities;
   determine execution probabilities for each of the successor nodes; wherein for at least a portion of the successor nodes the execution probability is different than the original execution probability;
   check the software entity by the processor; wherein said check comprises:
      determine a first state of the software entity; wherein the first state is associated with the software entity executing the parent node;
      randomly select a successor node out of the multiple successor nodes; wherein said randomly select is performed based on a stochastic selection based on the determined execution probabilities; and modify the first state of the software entity to a second state of the software entity; wherein the second state is associated with the software entity executing the randomly selected successor node.

11. The computer program product according to claim 10 wherein the computer readable program when executed on a computer causes the computer to convert a control flow graph representative of possible execution paths of the software entity to the directed acyclic graph.

12. The computer program product according to claim 10 wherein the computer readable program when executed on a computer causes the computer to determine an execution probability of a successor node in response to a number of paths in the directed acyclic graph that originate from the successor node; wherein each path comprises at least two nodes.

13. The computer program product according to claim 10 wherein the computer readable program when executed on a computer causes the computer to determine an execution probability of a successor node in an inverse proportion to a number of paths in the directed acyclic graph that originate from the parent node.

14. The computer program product according to claim 10 wherein the computer readable program when executed on a computer causes the computer to determine an execution probability of a successor node out of the successor nodes in response to a risk indication associated with at least one path that originates from the successor node.

15. The computer program product according to claim 10 wherein the computer readable program when executed on a computer causes the computer to determine a number(E) of software entity check iterations required for testing a predefined number (n) of execution paths at a probability (p); wherein the execution paths comprise at least the successor nodes; and to perform said check the software entity at least the number (E) of software entity check iterations.

16. The computer program product according to claim 10 wherein the computer readable program when executed on a computer causes the computer to convert the directed acyclic graph to a spanning tree and determine an execution probability of a successor node out of the multiple successor nodes to be negligible in case the successor node is not connected to the parent node in the spanning tree.

17. The computer program product according to claim 10, wherein the possible execution paths are represented by a first group of nodes and a second group of nodes; the second group of nodes comprising the multiple successor nodes; wherein the computer readable program when executed on the computer causes the computer to deterministically check execution paths that originate from the first group of nodes; and wherein the first group comprises at least two execution paths that comprise a second parent node; wherein each of the at least two execution paths has an alternative successor node to the second parent node.

18. A system for checking software entity modules, the system comprises: a storage unit adapted to store a directed acyclic graph representative of possible execution paths of the software entity; wherein multiple successor nodes that succeed a certain parent node are associated with original execution probabilities; and a processor, adapted to check the software entity by:

determining execution probabilities for each of the successor nodes; wherein for at least a portion of the successor nodes the execution probability is different than the original execution probability:

determining a first state of the software entity; wherein the first state is associated with the software entity executing the parent node;

randomly selecting a successor node out of the multiple successor nodes; wherein said randomly select is performed by performing a stochastic selection based on the determined execution probabilities; and modifying the first state of the software entity to a second state of the software entity; wherein the second state is associated with the software entity executing the randomly selected successor node.

19. The system according to claim 18 wherein the processor is adapted to convert a control flow graph representative of possible execution paths of the software entity to a directed acyclic graph.

20. The system according to claim 18 wherein the processor is adapted to determine an execution probability of a successor node in response to a number of paths in the directed acyclic graph that originate from the successor node; wherein each path comprises at least two nodes.

* * * * *